April 5, 1927.  S. ELLIS  1,623,720
IRRIGATED AND VENTILATED FLOWER BOX
Filed April 9, 1926
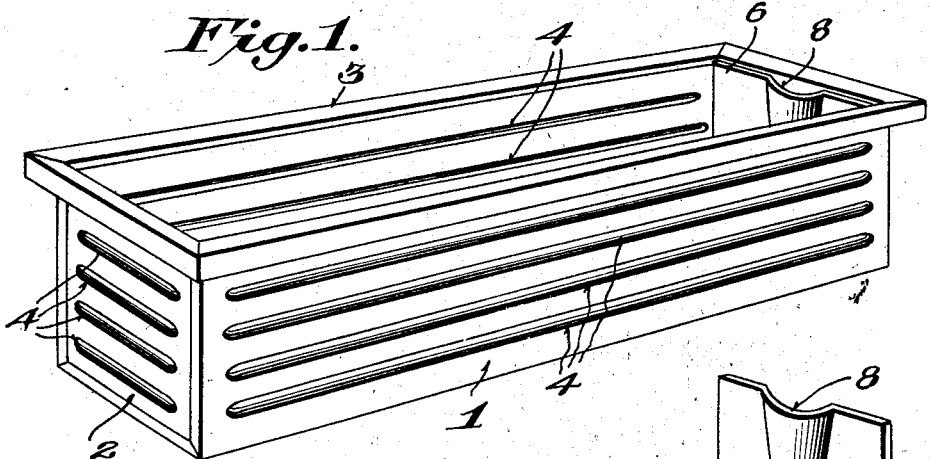
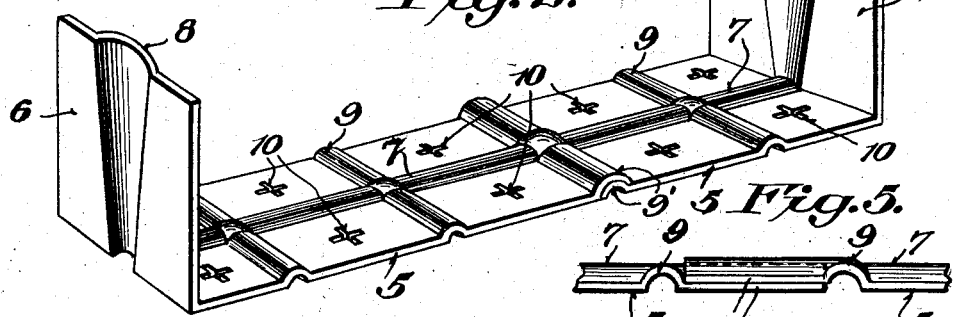
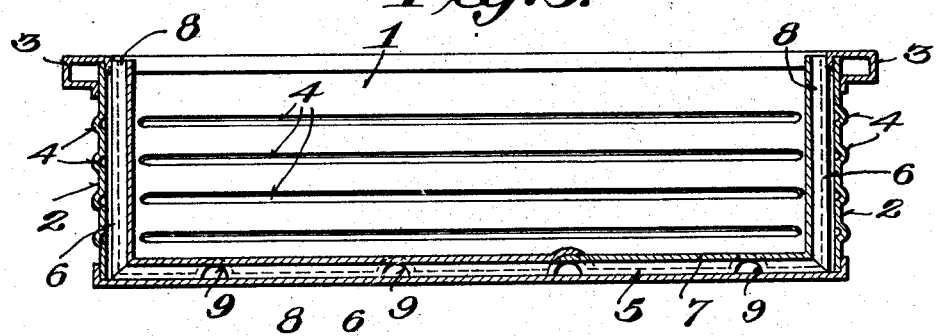
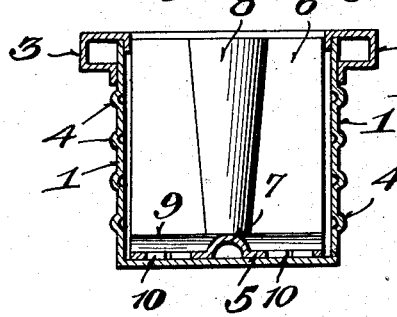
Inventor
Stuart Ellis,
By
Attorney Patented Apr. 5, 1927.

1,623,720

UNITED STATES PATENT OFFICE.

STUART ELLIS, OF FREDERICKSBURG, VIRGINIA.

IRRIGATED AND VENTILATED FLOWER BOX.

Application filed April 9, 1926. Serial No. 100,931.

The object of my invention is to provide a flower box of novel and attractive design having improved means for irrigating same and means for ventilating the base of the flower box whereby to promote the growth of plants. It is also an object of my invention to provide a box of this kind which can be manufactured conveniently at relatively small cost and which, by reason of its shape will prevent the nesting of boxes together with resulting damage to their appearance in shipping. I attain these and other objects of my invention by the device illustrated in the accompanying drawings, in which—

Figure 1 is a perspective view of my invention;

Fig. 2 is a perspective view of the ventilating plate;

Fig. 3 is a longitudinal section through the center of the box;

Fig. 4 is a transverse section through the box; and

Fig. 5 is a detail side elevation of a modified form of the ventilating plate.

Like numerals indicate like parts in each of the several views.

Referring to the accompanying drawings, I provide a rectangular preferably metal box 1 having spaced reinforcing ribs or corrugations 4 in its sides and ends, the box being provided with an overlapping rim 3 approximately rectangular in cross section which engages over the top edge of the box in the manner illustrated in Figs. 1 and 3. The sides of the box are made substantially vertical so as to prevent nesting of boxes together, as such nesting is calculated to damage the appearance of the boxes. I provide a pair of approximately L-shaped ventilating plates 5 each comprising the vertical portion 6 having the tapered vertical corrugation or inwardly arched channel 8 and a horizontal portion having the longitudinal raised corrugation 7 opening into the said vertical channel or corrugation 8, and having a plurality of transverse raised corrugations 9 opening out of the longitudinal corrugation 7, as shown in Figs. 2 and 3.

I provide a pair of similar ventilating plates 5 having their transverse end corrugations 9' overlapping each other or I may have the plate with the end portions shaped as shown in Fig. 5, the plate portions 7' overlapping and one of said portions abutting against the transverse section 9. I may, of course, also make the ventilating plates integral, but I have found that they can be manufactured at less cost if they are made as two separate plates, as shown and described above. I prefer to provide in each plate 5 a series of spaced slits 10 such as are illustrated in Fig. 2 to permit the water to seep up through the plate into the earth in the bottom of the flower box.

In use the ventilating plates are placed in the box in the manner illustrated in Figs. 3 and 4 with the portion 6 of the plate contacting with the box end 2 and provided with upstanding corrugation or channel 8 into which water may be poured and from whence it may flow through the channel formed by corrugations 9 and 7 to the earth or gravel at the bottom of the flower box. Water also may seep through slits 10. The channels 8, 7 and 9 also provide a ventilating means for the bottom of the flower box. This method of watering box plants results in maximum and rapid growth, the water being evenly distributed and evaporating through the earth and preventing it from forming a crust on the top.

What I claim is:

1. In a self-irrigating flower box, the combination of a substantially rectangular box, a pair of approximately L-shaped corrugated plates having one of the sides thereof seated in the bottom of the box, the ends of the plates overlapping each other and being transversely corrugated at the overlapping portions to provide a self locking joint.

2. In a self-irrigated flower box, the combination of a pair of approximately L-shaped plates seating in the bottom of the box, one of the portions of each of said plates being disposed vertically the other portion being disposed horizontally, the ends of the plates overlapping each other and forming a self-locking joint, each plate having a corrugation in its vertical portion, each plate having a raised corrugation longitudinal of its horizontal portion, the vertical portion of each plate having a corrugation communicating with the aforesaid longitudinal corrugation thereof to provide a continuous air and water channel from one end of the box to the other.

3. In a self-irrigated flower box, the combination of a pair of approximately L-shaped plates seating in the bottom of the box, one of the portions of each of said plates being disposed vertically the other portion being disposed horizontally, the ends of the plates overlapping each other and forming a self-locking joint, each plate having a corrugation in its vertical portion, a raised corrugation longitudinal of its horizontal portion, the vertical portion of each plate having a corrugation communicating with the aforesaid longitudinal corrugation thereof to provide a continuous air and water channel from one end of the box to the other, and a plurality of transverse raised corrugations opening out of a longitudinal corrugation for more efficient distribution of water.

4. In a self-irrigated flower box, the combination of an approximately rectangular metal box, a pair of L-shaped ventilating plates seating in the bottom of the box and having each a vertical side plate resting against an end of the box, each of said side plates having a vertical corrugation in the upstanding portion of the plate said corrugations being widest at the top, each of the ventilating plates having a longitudinal raised corrugation in the horizontal portion of the plate and each of the ventilating plates having transverse raised corrugations opening out of the longitudinal corrugation.

5. In a self-irrigated flower box, the combination of an approximately rectangular metal box, a pair of L-shaped ventilating plates seating in the bottom of the box and having each a vertical side plate resting against an end of the box, each of said side plates having a vertical corrugation in the upstanding portion of the plate said corrugations being widest at the top, each of the ventilating plates having a longitudinal raised corrugation in the horizontal portion of the plate and each of the ventilating plates having transverse raised corrugations opening out of the longitudinal corrugation, the ends of the plates having interlocking portions or engaging portions.

6. In an irrigated flower box, the combination of an approximately rectangular box, a ventilating plate device extending from one end of the box to the other end and having vertical portions resting against the ends of the box, each of said vertical portions having a corrugation projecting inwardly towards the center of the flower box to receive water and permit of ventilation, and the device including a longitudinally raised corrugation extending from the vertical corrugation in the vertical portion at one end of the box to the vertical corrugation in the vertical portion at the other end of the box.

7. In an irrigated flower box, the combination of an approximately rectangular box, a ventilating plate device extending from one end of the box to the other end and having vertical portions resting against the ends of the box, each of said vertical portions having a corrugation projecting inwardly towards the center of the flower box to receive water and permit of ventilation, the device including a longitudinally raised corrugation extending from the vertical corrugation in the vertical portion at one end of the box to the vertical corrugation in the vertical portion at the other end of the box, and transverse raised corrugations transversing the longitudinal corrugation and extending to the sides of the flower box.

8. In a self-irrigated flower box, the combination of a box of the type described, an irrigating plate extending over substantially the entire area of the bottom of the box, and resting flat on the bottom of the box, said plates having spaced vertical slits, said plate having a continuous channel to permit of the passage of air and water from one end of the box to the other and thence to the outside atmosphere to permit of free circulation of air through the box, and means at the end of the box for conducting water to and under said plate to permit it to pass through the irrigating channel.

STUART ELLIS.